United States Patent
Ooba

(10) Patent No.: US 8,384,949 B2
(45) Date of Patent: Feb. 26, 2013

(54) IMAGE-FORMING APPARATUS, CONTROL METHOD FOR IMAGE-FORMING APPARATUS, AND STORAGE MEDIUM

(75) Inventor: Hideaki Ooba, Sagamihara (JP)

(73) Assignee: Canon Kabushiki Kaisha (JP)

( * ) Notice: Subject to any disclaimer, the term of this patent is extended or adjusted under 35 U.S.C. 154(b) by 1266 days.

(21) Appl. No.: 12/170,273

(22) Filed: Jul. 9, 2008

(65) Prior Publication Data
US 2009/0015854 A1 Jan. 15, 2009

(30) Foreign Application Priority Data
Jul. 13, 2007 (JP) .................................. 2007-184476

(51) Int. Cl.
*G06F 15/00* (2006.01)
(52) U.S. Cl. ......................................... 358/1.9; 358/1.1
(58) Field of Classification Search ................. 358/1.13, 358/1.15, 1.1, 1.9
See application file for complete search history.

(56) References Cited

U.S. PATENT DOCUMENTS

| | | | | |
|---|---|---|---|---|
| 7,397,577 B2 * | 7/2008 | Ueda et al. | ................... | 358/1.15 |
| 2003/0142352 A1 * | 7/2003 | Matsunaga et al. | .......... | 358/1.15 |
| 2003/0191975 A1 * | 10/2003 | Kohara | ......................... | 713/300 |
| 2006/0117084 A1 * | 6/2006 | Morozumi et al. | ............ | 709/203 |
| 2007/0273896 A1 * | 11/2007 | Yamamura | ..................... | 358/1.1 |

FOREIGN PATENT DOCUMENTS
JP 2002-312140 A 10/2002
* cited by examiner

*Primary Examiner* — King Poon
*Assistant Examiner* — Iriana Cruz
(74) *Attorney, Agent, or Firm* — Rossi, Kimms & McDowell LLP

(57) ABSTRACT

An image-forming apparatus providing connection which is capable of realizing a user-friendly system environment in connection of a print-control apparatus and an image-forming apparatus present on an identical network. It is determined whether the image-forming apparatus is connected to the print-control apparatus (201). When it is determined that the image-forming apparatus is connected to the print-control apparatus (201), the image-forming apparatus responds to, without responding an inquiry associated with a part of a plurality of service functions, an inquiry associated with another part of the plurality of service functions.

10 Claims, 12 Drawing Sheets

FIG. 7

| PROVIDED SERVICE OF IMAGE-FORMING APPARATUS | PRINT-CONTROL APPARATUS CONNECTION ||
|---|---|---|
| | PRIORITY WHEN NOT CONNECTED | PRIORITY WHEN CONNECTED |
| PRINT | 1 | 3 |
| SCAN | 1 | 2 |
| WEB (APPARATUS INFORMATION DELIVERY) | 1 | 1 |
| SNMP/MIB | 1 | 1 |

FIG. 8

| PROVIDED SERVICE OF IMAGE-FORMING APPARATUS | PRIORITY |
|---|---|
| PRINT | 3 |
| SCAN | 2 |
| WEB | 1 |
| SNMP/MIB | 1 |

FIG. 9

| PROVIDED SERVICE OF IMAGE-FORMING APPARATUS (1101) | PRIORITY (1102) | |
|---|---|---|
| PRINT | 3 | 1103 |
| SCAN | 1 | 1104 |
| WEB (APPARATUS INFORMATION DELIVERY) | 1 | 1105 |
| MEDIA SELECTION | 3 | 1106 |
| SNMP/MIB | 1 | 1107 |

| PROVIDED SERVICE OF PRINT-CONTROL APPARATUS | PRIORITY | |
|---|---|---|
| PRINT | 1 | 1003 |
| SCAN | 2 | 1004 |
| MEDIA SELECTION | 1 | 1005 |
| SNMP/MIB | 1 | 1006 |

| PROVIDED SERVICE OF PRINT CONTROL APPARATUS | PRIORITY | |
|---|---|---|
| PRINT | 1 | 1301 |
| SCAN | 3 | 1302 |
| WEB (APPARATUS INFORMATION DELIVERY) | 3 | 1303 |
| MEDIA SELECTION | 1 | 1304 |
| SNMP/MIB | 3 | 1305 |

IMAGE-FORMING APPARATUS, CONTROL METHOD FOR IMAGE-FORMING APPARATUS, AND STORAGE MEDIUM

BACKGROUND OF THE INVENTION

1. Field of the Invention

The present invention relates to an image-forming apparatus connectable to a network, a control method for the image-forming apparatus, and a storage medium which stores a program for causing a computer to execute the control method for the image-forming apparatus.

2. Description of the Related Art

Conventionally, there has been known a print-control apparatus connected to a network. The print-control apparatus is used when a network printer function is provided in an image-forming apparatus. The print-control apparatus is also used for the purpose of extending and supplementing the network printer function provided in an image-forming apparatus in advance. The network printer function is a function of printing out an image corresponding to an image signal inputted from an external apparatus through the network.

As an image-forming apparatus connectable to the network via such a print-control apparatus, for example, besides an image-forming apparatus disclosed in Japanese Laid-Open Patent Publication (Kokai) No. 2002-312140, there is an image-forming apparatus shown in FIG. 16.

FIG. 16 is a schematic diagram showing connection of a conventional image-forming system.

As shown in FIG. 16, in the connection of the image-forming system, a terminal apparatus 5009 and a print-control apparatus 5001 are connected on a network 5011. An image-forming apparatus 5007 is connected to the print-control apparatus 5001 via a LAN 5005 and a dedicated line 5006.

The print-control apparatus 5001 includes connectors 5002 and 5003 and an interface 5004 for the dedicated line 5006. The connector 5002 is a connector for a NIC (Network Interface Card) which manages low-layer level connection to the network 5011. The connector 5003 is a connector for a NIC which manages low-layer level connection to the LAN 5005.

A data packet transmitted from the terminal apparatus 5009 to the print-control apparatus 5001 is propagated through the network 5011 and received by the print-control apparatus 5001 via the connector 5002. When the received data packet is determined as print data, the data packet is subjected to data processing by the print-control apparatus 5001. Data packets subjected to the data processing are forwarded from the connectors 5003 and 5004 to be transmitted to the LAN 5005 and the dedicated line 5006. The data packets forwarded to the LAN 5005 and the dedicated line 5006 are received by the image-forming apparatus 5007 via a network interface 5008 and a dedicated transfer interface 5010, respectively.

The image-forming apparatus 5007 receives the data packet and performs print processing on a recording medium such as paper according to a print processing procedure of the image-forming apparatus 5007 per se. When processing other than the print processing is performed, the data packet transmitted to the image-forming apparatus 5007 is also received by the print-control apparatus 5001. After receiving the data packet, the print-control apparatus 5001 applies processing necessary for transmission to the image-forming apparatus 5007 to the received data packet and transmits the data packet to the image-forming apparatus 5007.

The data packet transmitted from the image-forming apparatus 5007 is received by the print-control apparatus 5001. The print-control apparatus 5001 applies processing necessary for transmission to the terminal apparatus 5009 on the network 5011 to the received data packet and transmits the data packet to the terminal apparatus 5009. This is realized by using a network packet transfer technique (NAT/NAPT) for transmitting a data packet transmitted by an image-forming apparatus to a network assuming that the data packet is transmitted by a print-control apparatus.

Such a configuration of the conventional image-forming system provides the advantage that it is possible to use the image-forming apparatus and the print-control apparatus without being conscious of these apparatuses.

However, according to the technological progress in recent years, the related art described above cannot cope with some techniques. Examples of such techniques include techniques which the network transfer technique (NAT/NAPT) cannot cope with. Specifically, the techniques are techniques such as IPv6 (Internet Protocol Version 6) and IPsec (IP Security Protocol).

When IPv6 is adopted, the network transfer technique (NAT/NAPT) used in the related art cannot be used. Therefore, it is necessary to use a new network transfer technique. Further, when IPsec is adopted, a terminal apparatus and an image-forming apparatus exchange keys and, when a network packet is has a rewritten address, communication is immediately finished. Such a technique is an extremely useful technique in view of significance of network security in these days. However, when the image-forming apparatus is connected to the print-control apparatus in the configuration described above, such a technique cannot be used between the image-forming apparatus and the terminal apparatus. This is because a network packet transfer technique implemented in the print-control apparatus is judged as disguising of a network packet by these techniques.

To make it possible to realize the techniques such as IPv6 and IPsec, it is conceivable to change the connection of the print-control apparatus and the image-forming apparatus. However, when the connection is simply changed, the system is user-unfriendly.

As an example, in a system in which a print-control apparatus and an image-forming apparatus are connected to an identical network, when a user performs print operation in the image-forming apparatus attached with the print-control apparatus from a terminal apparatus, problems described below occur. The user does not understand which of network addresses of the print-control apparatus and the image-forming apparatus should be designated. Therefore, the system confuses the user and is user-unfriendly. When, for example, the user performs device search using an application program and searches for a device on a network, since both the print-control apparatus and the image-forming apparatus are detected, the user is confused.

SUMMARY OF THE INVENTION

The present invention provides an image-forming apparatus, a control method for the image-forming apparatus, and a storage medium which stores a program for causing a computer to execute the control method for the image-forming apparatus described below.

The present invention provides connection which is capable of realizing a user-friendly system environment in connection of a print-control apparatus and an image-forming apparatus present on an identical network. The present invention makes it possible to flexibly cope with the techniques such as IPv6 and IPsec.

In the first aspect of the present invention, there is provided an image-forming apparatus providing a plurality of service functions, comprising a determination unit adapted to determine whether the image-forming apparatus is connected to a control apparatus, a response unit adapted to respond, in a case that it is determined by the determination unit that the image-forming apparatus is not connected to the control apparatus, to an inquiry concerning the plurality of service functions, and a control unit adapted to control the response unit so as not to respond, in a case that it is determined by the determination unit that the image-forming apparatus is connected to the control apparatus, to an inquiry associated with a part of the plurality of service functions and so as to respond to an inquiry associated with another part of the plurality of service functions.

In the second aspect of the present invention, there is provided a control method of controlling an image-forming apparatus that provides a plurality of service functions, the control method comprising determining whether the image-forming apparatus is connected to a control apparatus, responding, in a case that it is determined in the determination step that the image-forming apparatus is not connected to the control apparatus, to an inquiry concerning the plurality of service functions, and controlling the response step so as not to respond, in a case that it is determined in the determination step that the image-forming apparatus is connected to the control apparatus, to an inquiry concerning a part of the plurality of service functions and so as to respond to an inquiry concerning another part of the plurality of service functions.

In the third aspect of the present invention, there is provided a computer-readable storage medium storing a program for causing a computer to execute a control method of controlling an image-forming apparatus that provides plural service functions, the program comprising a determination module for determining whether the image-forming apparatus is connected to a control apparatus, a response module for responding, in a case that it is not determined by the determination module that the image-forming apparatus is connected to the control apparatus, to an inquiry concerning the plurality of service functions, and a control module for controlling the responding module so as not to respond, in a case that it is determined by the determination module that the image-forming apparatus is connected to the control apparatus, to an inquiry concerning a part of the plurality of service functions and so as to respond to an inquiry concerning another part of the plurality of service functions.

According to the present invention, it is possible to provide connection which is capable of a user-friendly system environment in connection of a print-control apparatus and an image-forming apparatus, and it is possible to flexibly cope with the techniques such as IPv6 and IPsec.

Further features of the present invention will become apparent from the following detailed description of exemplary embodiments with reference to the attached drawings.

BRIEF DESCRIPTION OF THE DRAWINGS

FIG. 7 is a diagram showing an example of a table including contents of a function database set in the image-forming apparatus in FIG. 3.

FIG. 8 is a diagram showing an example of the table including the contents of the function database set in the image-forming apparatus in FIG. 3.

FIG. 9 is a diagram showing an example of an update result of the table including the contents of the function database set in the image-forming apparatus in FIG. 3.

DETAILED DESCRIPTION OF THE EMBODIMENTS

The present invention will now be described in detail with reference to the drawings showing a preferred embodiment thereof.

<Configuration of an Image-Forming System>

Figure 1:
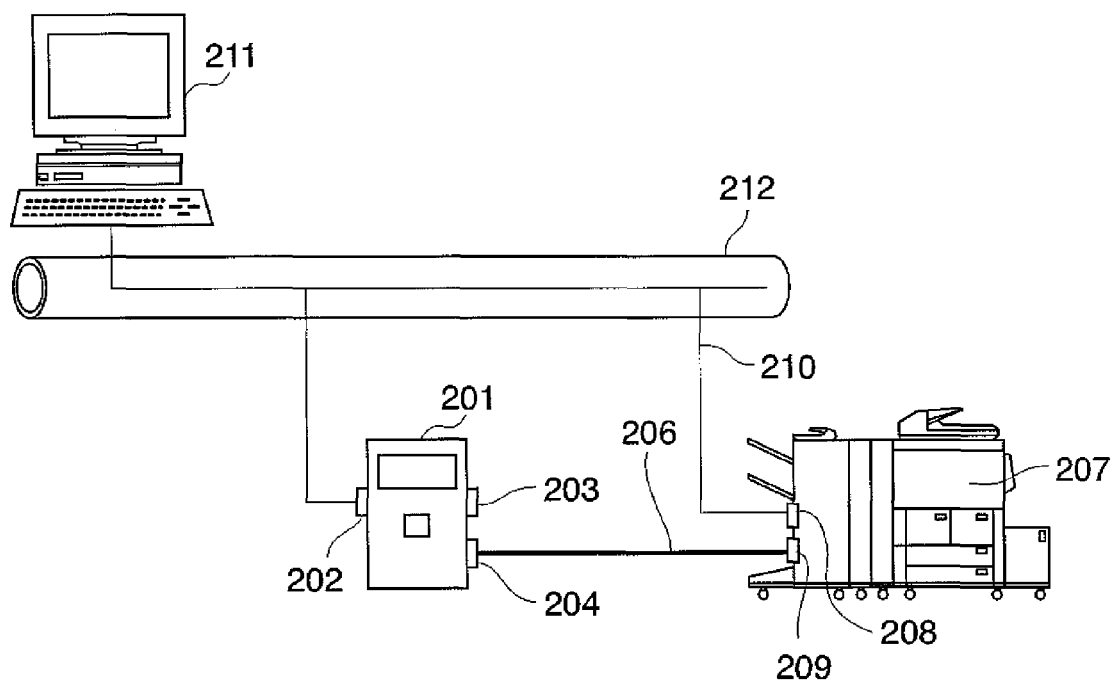
FIG. 1 is a schematic diagram showing connection of an image-forming system according to an embodiment of the present invention.

FIG. 1 is a schematic diagram showing connection of an image-forming system according to an embodiment of the present invention.

In the image-forming system, a terminal apparatus 211, a print-control apparatus 201, and an image-forming apparatus 207 are connected on a network 212. The print-control apparatus 201 and the image-forming apparatus 207 are connected via a dedicated line 206.

Figure 16:
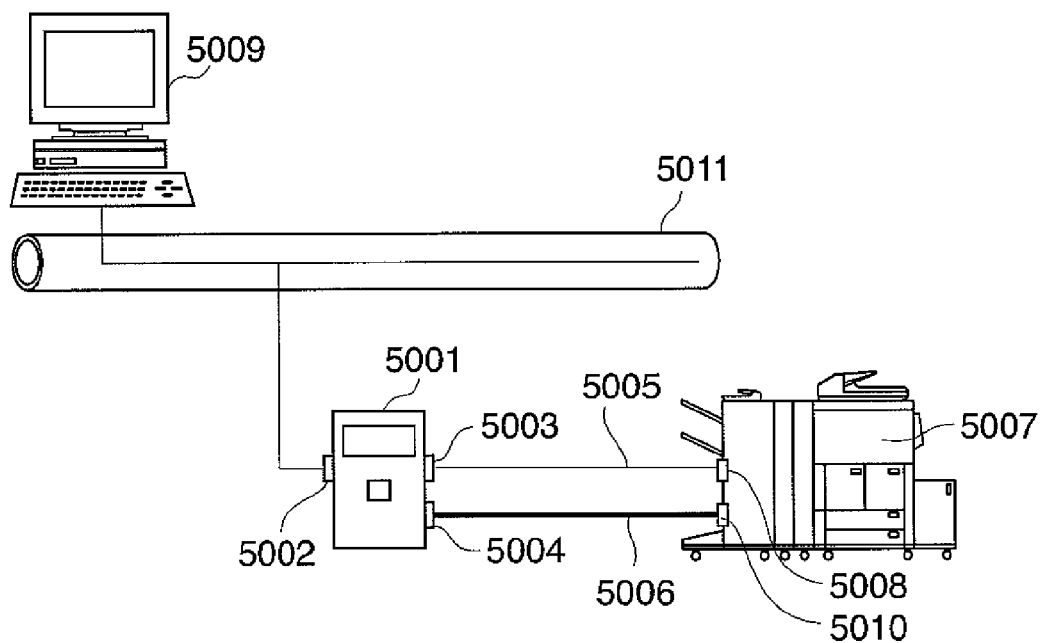
FIG. 16 is a schematic diagram showing connection of a conventional image-forming system.

The print-control apparatus 201 includes connectors 202, 203, and 204. The connector 202 is a connector for a NIC which manages low-layer level connection to the network 212. The connector 203 is equivalent to the connector 5003 shown in FIG. 16 but is not used in this embodiment. The connector 204 serves as an interface for the dedicated line 206.

The image-forming system according to this embodiment is characterized in that, in particular, the image-forming apparatus 207 is connected to the network 212 through a signal line 210. Data on the network 212 is inputted from the network interface 208 to the image-forming apparatus 207 through the signal line 210. Print data forwarded from the connector 204 of the print-control apparatus 201 to the dedicated line 206 is inputted to the image-forming apparatus 207 via a connector 209.

<Configuration of the Print-Control Apparatus>

Figure 2:
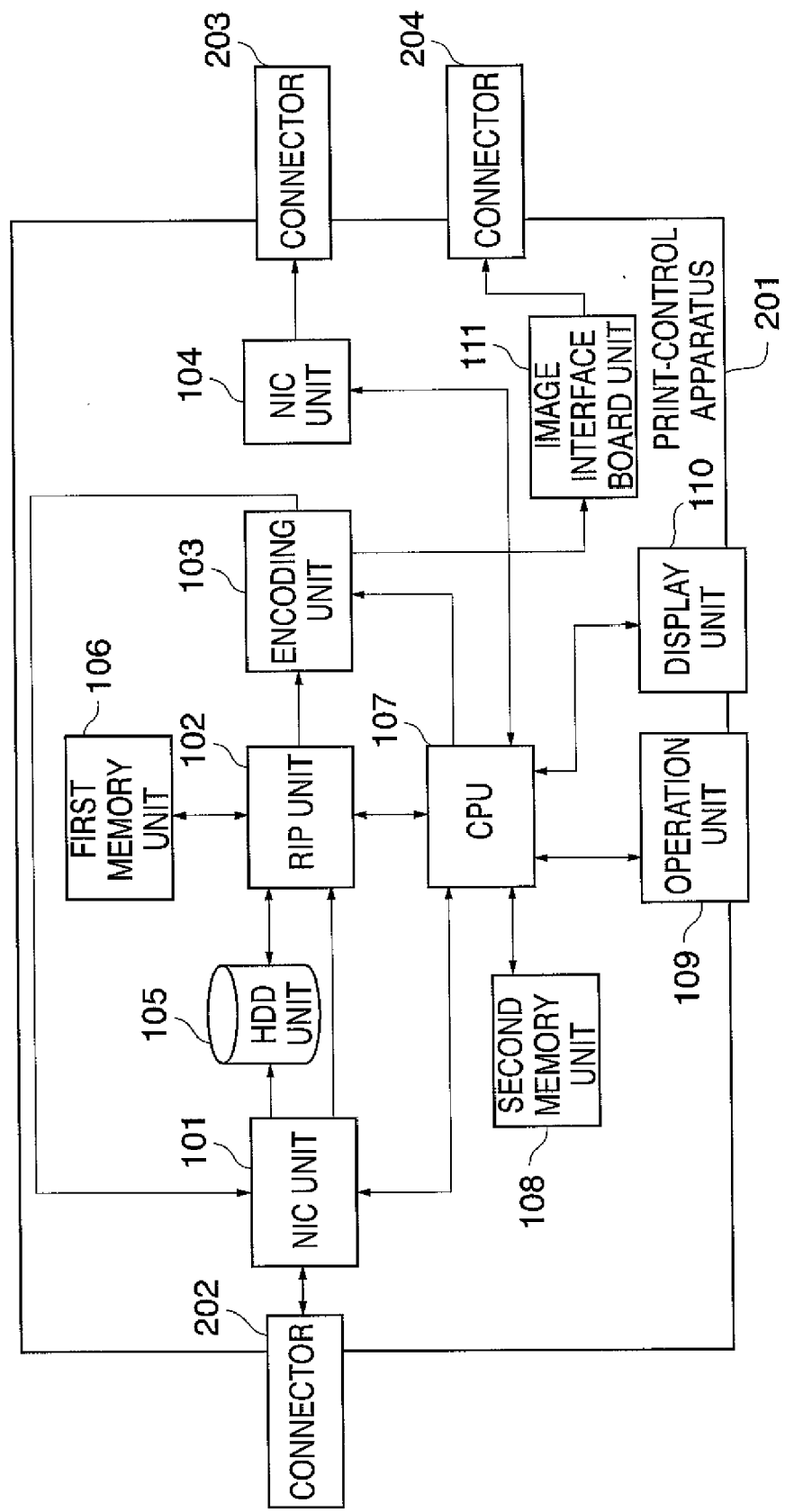
FIG. 2 is a block diagram schematically showing the configuration of a print-control apparatus in FIG. 1.

FIG. 2 is a block diagram schematically showing the configuration of the print-control apparatus 201 in FIG. 1.

The print-control apparatus 201 includes a NIC unit 101 connected to the connector 202.

The NIC unit 101 has a function of a first network interface which manages low-layer level connection to a LAN. A RIP (Raster Image Processing) unit 102 and a hard disk drive (HDD) unit 105 are connected to an output side of the NIC unit 101. The RIP unit 102 has a function of changing a received print language such as a PDL (Page Description Language) or a specific (compressed in JBIG (Joint Bi-level Image Experts Group)) data format to a raster image. The HDD unit 105 is a storing unit for temporarily storing (spooling) print data received by the NIC unit 101 or temporarily storing compressed data after RIP. A first memory unit 106 is a memory used by the RIP unit 102 for image-expansion processing.

Data changed to the raster image by the RIP unit 102 is inputted to an encoding unit 103. The encoding unit 103 converts the data into print data of a format or a data format supported by the image-forming apparatus 207.

The print-control apparatus 201 includes a NIC unit 104 and an image-interface board unit 111. The NIC unit 104 functions as a second network interface which manages low-layer level connection. The connector 203 is a connector for this interface. The data outputted from the encoding unit 103 is outputted to the connector 202 via the image-interface board unit 111.

The print-control apparatus 201 further includes a CPU 107, a second memory unit 108, an operation unit 109, and a display unit 110. The CPU 107 manages control of the entire print-control apparatus 201. The second memory unit 108 is used as data temporary storage area by the CPU 107. A function database (FIGS. 12 and 13 referred to later), which characterizes this embodiment, is stored in the second memory unit 108.

The operation unit 109 has buttons, keys, and the like and is used for performing operation of the print-control apparatus 201. The display unit 110 notifies information to a user by displaying images and characters on a screen. The display unit 110 includes an operation panel integrally configured with the operation unit 109. The display unit 110 includes, for example, a touch panel.

The dedicated line 206 is formed by using the image-interface board unit 111 and the connector 204. Image data transferred from the print-control apparatus 201 to the image-forming apparatus 207 is transferred through the dedicated line 206.

A data packet from the terminal apparatus 211 to the print-control apparatus 201 is propagated through the network 212 and inputted to the print-control apparatus 201 via the connector 202. Reception processing for the data packet is performed by the NIC unit 101 in the inside of the print-control apparatus 201. When the data packet received by the NIC unit 101 is a data packet conforming to TCP/IP, a destination port number is included in a header information section of the packet.

The destination port number is information indicating to which of programs and processes of an apparatus, from which a packet is received, data should be transmitted. A different port number is allocated as the destination port number for each of communication protocols and programs.

For example, port number are allocated as follows:
FTP (File Transfer Protocol)=Port 21
SMTP (Simple Mail Transfer Protocol)=Port 25
SNMP=Port 161

Then, a port number included in a header of a received data packet is checked, and it is determined whether the port number corresponds to print processing. This makes it possible to determine whether the packet is print data or other data such as control data.

Therefore, the NIC unit 101 extracts the destination port number from the header of the received data packet and determines whether the data packet is print data or control data on the basis of the destination port number.

When it is determined that the data packet is the print data, the received data is written in the HDD unit 105 according to the control by the CPU 107 when necessary. This is queuing (spool) which is generally performed for the purpose of improving a data transfer rate. The data stored in the HDD unit 105 is read out from the RIP unit 102 according to an instruction of the CPU 107. On the other hand, print data not subjected to queuing is directly transferred from the NIC unit 101 to the RIP unit 102 according to an instruction of the CPU 107.

The print data transmitted to the RIP unit 102 in this way is subjected to raster image processing by the RIP unit 102. Subsequently, the encoding unit 103 performs, on the basis of a predetermined data format interpretable by the image-forming apparatus 207 and a format of the received data, encoding of the print data into the data format interpretable by the image-forming apparatus 207. Instead of the predetermined data format, described above, for example, a data format acquired from the image-forming apparatus 207 by communication, a data format designated from the operation unit 109, and the like may be used.

Since this encode processing is performed as required, the encode processing may be skipped if encoding is unnecessary, for example, when a format of the received data is interpretable by the image-forming apparatus 207 as it is. The data after the encoding needs to be a format interpretable by the image-forming apparatus 207. A format of the data is changed according to an ability of interpreting means incorporated in the image-forming apparatus 207. For example, the format is changed to a specific print language format or a data format compressed by a specific method such as JBIG.

The data encoded in this way when necessary is changed to a data packet again by the NIC unit 101 to be transmitted to the network 212. The data packet is forwarded from the connector 202 and transmitted to the image-forming apparatus 207 via the network 212 and the network interface 208.

The image-forming apparatus 207 receives the data packet and performs print processing on a recording medium such as paper according to a print processing procedure of the image-forming apparatus 207. As another data transfer method, the data is transferred from the encoding unit 103 to the image-interface board unit 111, forwarded to the dedicated line 206 through the connector 204, and transmitted to the image-forming apparatus 207 via the connector 209.

When scanned image data at a reader unit 303 is transmitted from the image-forming apparatus 207 to the terminal apparatus 211, a data packet is forwarded from the network interface 208 to the network 212 and inputted to the terminal apparatus 211.

<Structure of the Image-Forming Apparatus>

Figure 3:
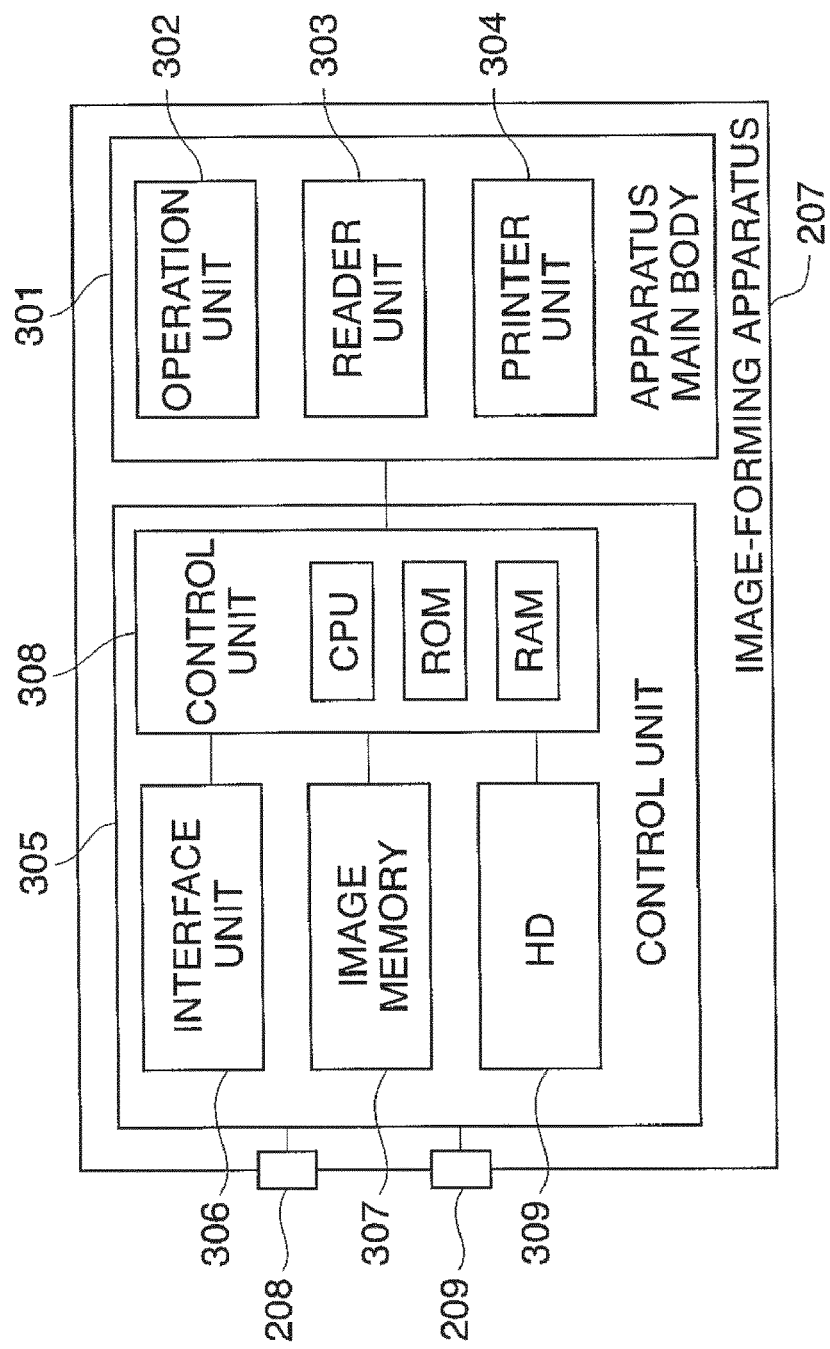
FIG. 3 is a block diagram showing the configuration of an image-forming apparatus in FIG. 1.

FIG. 3 is a block diagram showing the configuration of the image-forming apparatus 207 in FIG. 1.

As shown in FIG. 3, the image-forming apparatus 207 according to this embodiment is comprised of an image-forming apparatus main body 301 and an image input/output control unit 305. The image-forming apparatus main body 301 includes an operation unit 302, a reader unit 303, and a printer unit 304. The operation unit 302 is used to operate the image-forming apparatus main body 301 and the image input/output control unit 305. A display panel for operation is integrally attached to the operation unit 302. The reader unit 303 scans an image of an original and outputs image data corresponding to the original image to the printer unit 304 and the image input/output control unit 305. The printer unit 304 records an image corresponding to the image data from the reader unit 303 or the image input/output control unit 305 on recording paper.

The image input/output control unit 305 is connected to the reader unit 303 and includes an interface unit 306, an image memory 307, a control unit 308, and a hard disk (HD) 309. The network interface 208 and the connector 209 are connected to the interface unit 306. In the hard disk (HD) 309, setting information of the image-forming apparatus 207 such as an address book, an operation history, a user setting, an ID setting, and a network setting is stored. The function database (FIGS. 7 to 9 referred to later) characterizing this embodiment is also stored in the hard disk (HD) 309.

The interface unit 306 is an interface between the print-control apparatus 201 and the terminal apparatus 211 on the network 212 and the control unit 308. The interface unit 306 receives code data representing an image transferred from the print-control apparatus 201 in the connector 209, expands the received data into image data which can be recorded in the printer unit 304, and passes the image data to the control unit 308. The interface unit 306 receives code data representing image data transferred from the terminal apparatus 211 in the network interface 208 such as Ethernet (registered trademark). When necessary, the interface unit 306 expands the received data into data which can be recorded in the printer unit 304 and passes the data to the control unit 308. The connector 209 may be a network interface such as Ethernet (registered trademark) and connected to the print-control apparatus 201 through a network. The connector 209 may also be an interface such as a parallel interface or a USB interface and directly connected to the print-control apparatus 201 through an interface cable. Not only one cable but also a large number of cables may be used for the connector 209.

The control unit 308 has a CPU, a ROM, and a RAM. The CPU of the control unit 308 loads and executes a program stored in the ROM or other recording media and controls a flow of data among the reader unit 303, the interface unit 306, the image memory 307, and the like. Another nonvolatile memory, in which data is not erased even if a power supply is turned off, may be provided instead of the HD 309 and data may be stored in the nonvolatile memory.

<Process Flow During the Start of the Image-Forming Apparatus>

The process during the start of the image-forming apparatus 207 is explained with reference to FIGS. 4 to 9.

Figure 4:
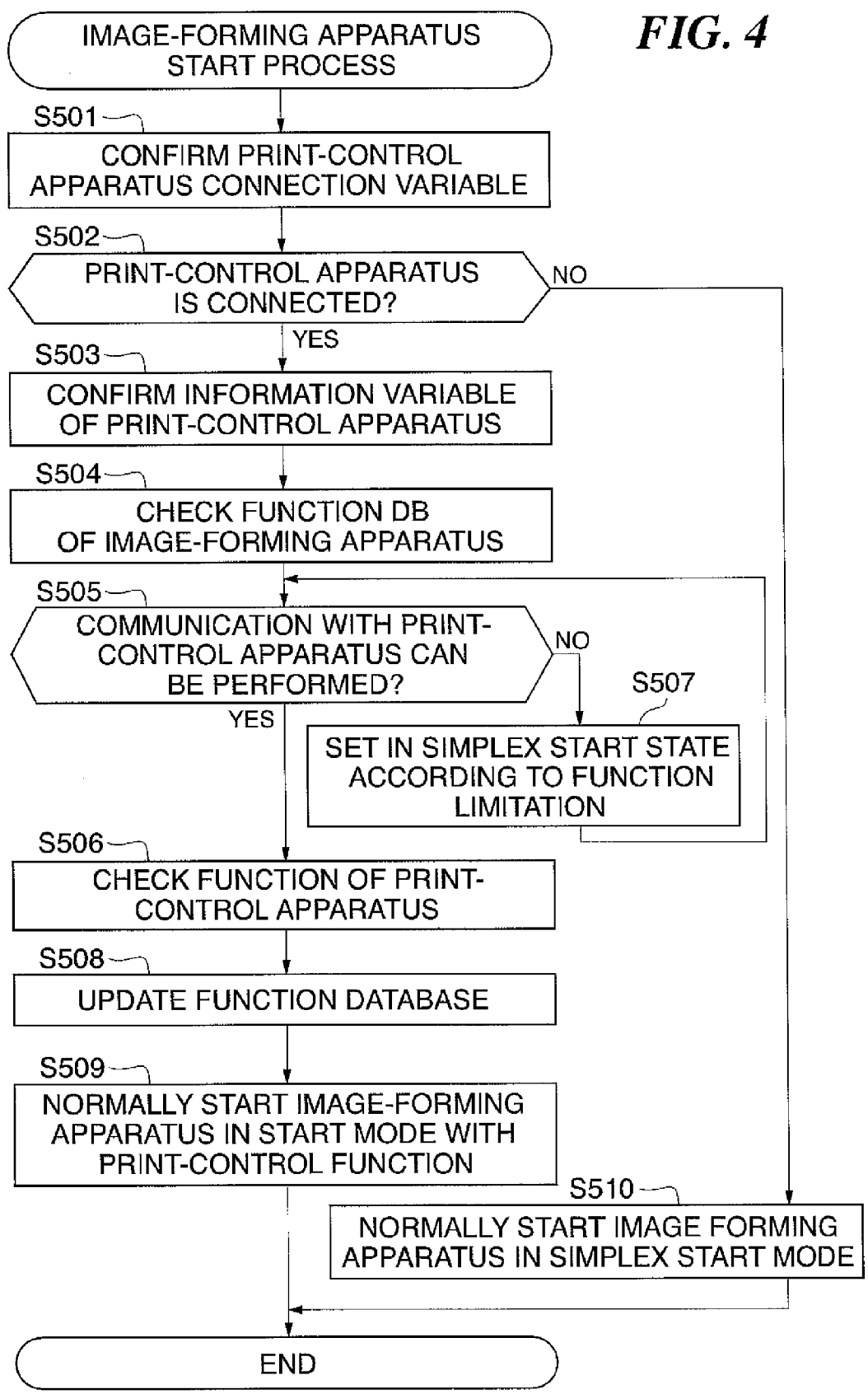
FIG. 4 is a flowchart showing image-forming apparatus start process executed during the start of the image-forming apparatus according to the present embodiment.
Figure 5:
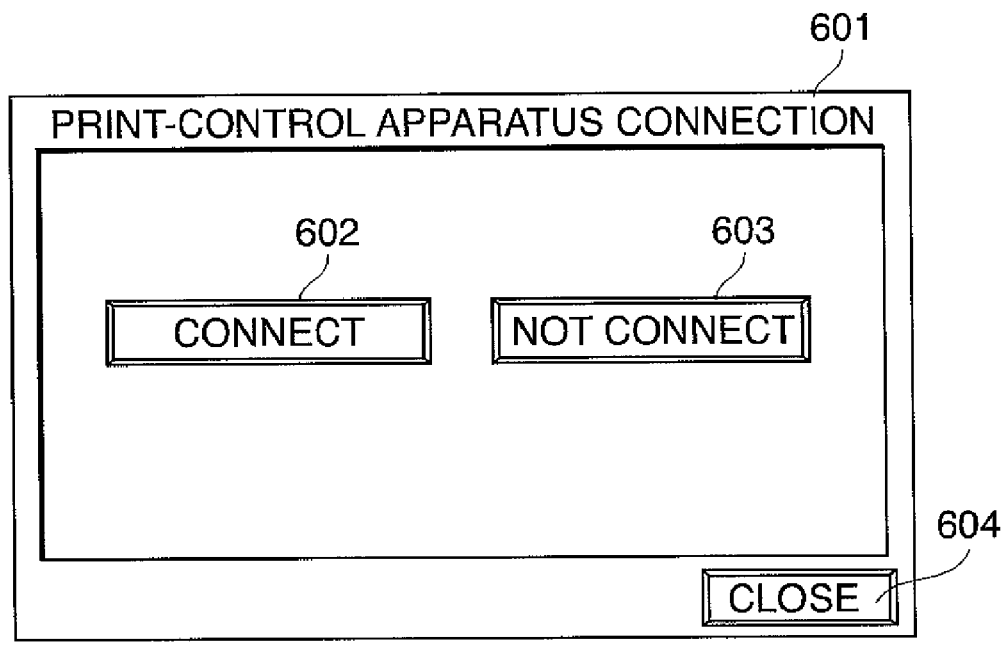
FIG. 5 is a diagram showing an example of a connection setting screen for the print-control apparatus displayed on an operation unit in the image-forming apparatus in FIG. 3.
Figure 6:
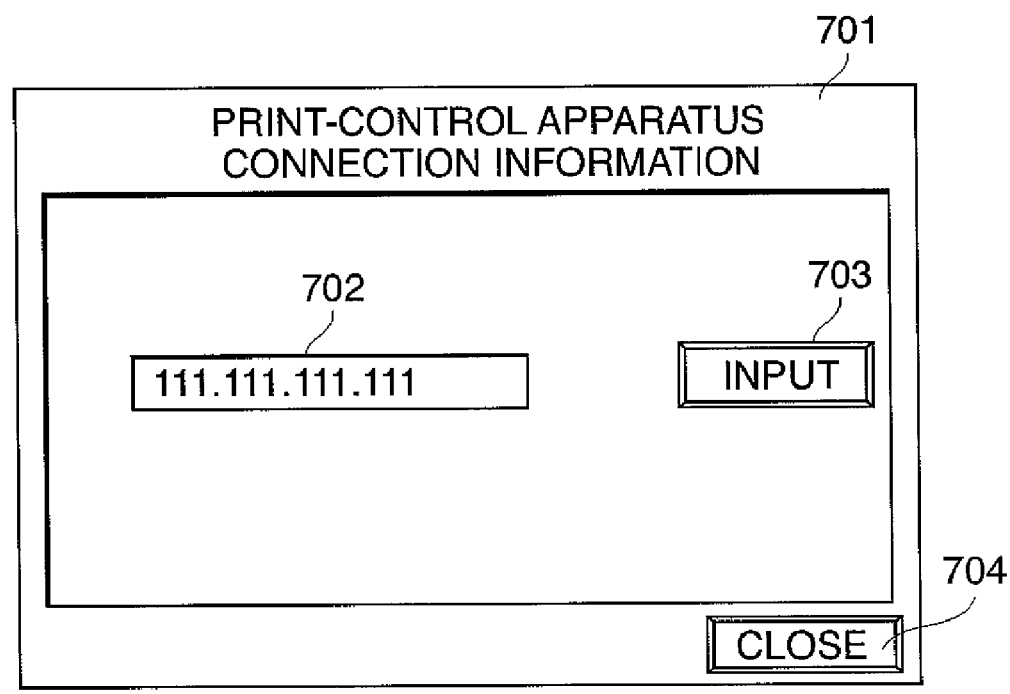
FIG. 6 is a diagram showing an example of an information setting screen for the print-control apparatus displayed on the operation unit of the image-forming apparatus in FIG. 3.

FIG. 4 is a flowchart showing image-forming apparatus start process executed during the start of the image-forming apparatus 207 according to the present embodiment. FIG. 5 is a diagram showing an example of a connection setting screen of the print-control apparatus 201 displayed on the operation unit 302 in the image-forming apparatus 207 in FIG. 3. FIG. 6 is a diagram showing an example of an information setting screen of the print-control apparatus 201 displayed on the operation unit 302 in the image-forming apparatus 207 in FIG. 3.

In FIG. 4, when a power supply of the image-forming apparatus 207 is turned on, the control unit 308 confirms that the print-control apparatus 201 is connected to the image-forming apparatus 207, in step S501. The connection of the image-forming apparatus 207 and the print-control apparatus 201 is set on a screen 601 shown in FIG. 5 and can be confirmed on the screen 601.

Specifically, by depressing a "connect" button 602 on the screen 601 in FIG. 5, the user sets the print-control apparatus 201 to be connected to the image-forming apparatus 207. The print-control apparatus 201 is set to be not connected to the image-forming apparatus 207 by depressing a "not connect" button 603.

A method of sensing connection of the print-control apparatus 201 without using the screen 601 may be adopted. A method of setting connection of the print-control apparatus 201 with hardware rather than controlling the connection with software as in the screen 601 may be adopted. By performing the connection setting for the print-control apparatus 201, a variable which stores connectability information of the print-control apparatus 201 is changed. To close this screen, the user depresses a "close" button 604.

In step S501 in FIG. 4, the control unit 308 confirms this print-control apparatus connection variable and proceeds to step S502. In step S502, the control unit 308 determines, on the basis of a value of the print-control apparatus connection variable, whether the print-control apparatus 201 is connected to the image-forming apparatus 207. When the print-control apparatus 201 is not connected to the image-forming apparatus 207, the process proceeds to step S510, performs normal start of the image-forming apparatus 207 in a simplex start mode, followed by terminating the process. When the print-control apparatus 201 is connected to the image-forming apparatus 207, the process proceeds to step S503 and confirms information variable of the print-control apparatus 201. The information variable of the print-control apparatus 201 is information for specifying the print-control apparatus 201 connected to the image-forming apparatus 207 in a one-to-one relation. Values of the information variable are values indicating a network address (an IP address, etc.), a physical address, a name, and the like of the print-control apparatus 201 and are set on a print-control apparatus connection information screen 701 in FIG. 6.

Specifically, a value presently inputted in an input area 702 is displayed on the screen 701 in FIG. 6 and, when the user depresses an "input" button 703, a software keyboard screen for inputting a value is opened, and the user inputs connection information concerning the print-control apparatus 201. After selecting the input area 702, the user may input a value with a hardware keyboard without using the button 703. When the input is finished, the user depresses a "close" button 704.

When the input of the connection information concerning the print-control apparatus 201 is finished on the screen 701, a value of this input is stored in the information variable of the print-control apparatus 201. In this case, a button or a form for selecting whether the input value is a network address, a physical address, or a name may be displayed.

In the following step S504, the control unit 308 checks the function database of the image-forming apparatus 207 and acquires a value of priority for each of provided services. Contents of the function database are shown in FIG. 7. FIG. 7 is a diagram showing an example of a table including the contents of the function database set in the image-forming apparatus 207 in FIG. 3. The function database is stored in, for example, the HD 309 shown in FIG. 3.

In FIG. 7, a column 801 represents a type of a service provided by the image-forming apparatus 207. Columns 802, 803, and 804 represent that priority of a provided service changes according to whether the print-control apparatus 201 is connected. The column 803 represents priority at the time when the print-control apparatus 201 is not connected. The column 804 represents priority at the time when the print-control apparatus 201 is connected. Rows 805 to 808 represent values of priority (priority data) of the respective provided services at the time when the print-control apparatus 201 is connected and is not connected, respectively.

In this embodiment, a value "1" of priority indicates that a service is provided, a value "2" of priority indicates that a service is provided by adjusting the service, and a value "3" of priority indicates that a service is not provided. As other forms of priority value setting, for example, it is conceivable to set a value of priority only according to whether a service is provided.

In the row 805 indicating a print service, a value of priority at the time when the print-control apparatus 201 is not connected is set to "1" and a value of priority at the time when the print-control apparatus 201 is connected is set to "3". This means that the print service is provided when the print-control apparatus 201 is not connected but the print service is not provided when the print-control apparatus 201 is connected. Besides, as shown in FIG. 7, for a scan service in the row 806, a Web service in the row 807, and an SNMP/MIB service in the row 808, respective vales of priority are set according to whether the print-control apparatus 201 is connected.

When the acquisition of the values of priority in the step S504 is finished, the process proceeds to step S505. In the step S505, the control unit 308 determines, according to the connection information concerning the print-control apparatus 201 acquired in step S503, whether communication with the print-control apparatus 201 can be performed. When the communication with the print-control apparatus 201 cannot be performed, the process proceeds to step S507 and starts the print-control apparatus 201 in a state corresponding to the value of priority acquired in the step S504.

Thereafter, when predetermined waiting time elapses, the process returns to the step S505 to perform connection with the print-control apparatus 201 again. The steps S505 and S507 are repeatedly performed until the communication with the print-control apparatus 201 becomes possible. In this case, when the print-control apparatus 201 is not started, the control unit 308 starts the print-control apparatus 201 in a function limited state.

As another form, it is conceivable that, when the print-control apparatus 201 is not started, the control unit 308 starts the print-control apparatus 201 with the priority at the time when the print-control apparatus 201 is not connected (the column 803 in FIG. 7) assuming that the print-control apparatus 201 is not connected.

In the step S505, the control unit 308 changes a communication method according to the connection information concerning the print-control apparatus 201 acquired in the step S503. As an example, when an IP address is set when a network address is inputted, after transmitting a packet of Ping, the control unit 308 can confirm, by confirming whether the print-control apparatus 201 responds to the packet, whether communication with the print-control apparatus 201 can be performed.

When it is confirmed in the step S505 that the communication with the print-control apparatus 201 can be performed, the process proceeds to step S506 to check a function of the print-control apparatus 201. The image-forming apparatus 207 and the print-control apparatus 201 exchange services and priorities with each other.

Specifically, the image-forming apparatus 207 extracts, from the function database in FIG. 7, the priority in the column 804, i.e., the priority at the time when the print-control apparatus 201 is connected and creates a database for providing a service function shown in FIG. 8 in which a priority list is described. FIG. 8 is a diagram showing an example of a table including the contents of the function database set in the image-forming apparatus 207 in FIG. 3. The image-forming apparatus 207 transmits the priority list of the function database to the print-control apparatus 201 and receives a priority list of a function database (described later with reference to FIG. 12) from the print-control apparatus 201.

When the control unit 308 checks the function of the print-control apparatus 201 in the step S506 and the exchange of the priority lists is finished, the process proceeds to step S508 to update the function database of the image-forming apparatus 207. A result of the update of the function database is shown in FIG. 9. FIG. 9 is a diagram showing an example of an update result of the table including the contents of the function database set in the image-forming apparatus 207 in FIG. 3.

In this process for updating the function database, a service function which can be provided by one of the print-control apparatus 201 and the image-forming apparatus 207 and cannot be provided by the other is directly added to the function database. When both the print-control apparatus 201 and the image-forming apparatus 207 can provide the same service function (when service functions provided by both the apparatuses conflict), the control unit 308 compares values of priority added thereto. The print-control apparatus 201 and the image-forming apparatus 207 having a smaller value of priority, i.e. higher priority, provides the service function. The control unit 308 changes a value of priority of the other, which does not provide the service function, to "3". The control unit 308 changes value of priority of the print-control apparatus 201 or the image-forming apparatus 207, which provides the service function, to "1". When the values of priority are the same, in this embodiment, the image-forming apparatus 207 always provides the service function. When the values of priority are the same, both the print-control apparatus 201 and the image-forming apparatus 207 may be able to provide the service function. When both the values of priority of the print-control apparatus 201 and the image-forming apparatus 207 are "3", both the apparatuses do not provide the service function. Specifically, the control unit 308 compares priorities in the function databases in FIGS. 8 and 12 and adjusts the priorities as described below.

Figures 11, 12:
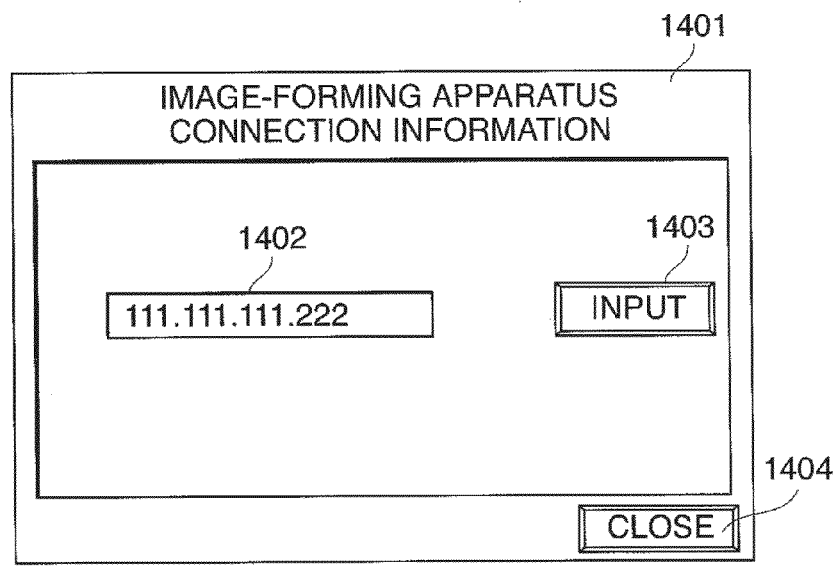
FIG. 11 is a diagram showing an example of a connection setting screen for the image-forming apparatus displayed on a display unit of the print-control apparatus in FIG. 2.
FIG. 12 is a diagram showing an example of a table including contents of a function database set in the print-control apparatus in FIG. 2.

First, concerning the print services a value of priority of the image-forming apparatus 207 is "3" (see the row 805 in FIG. 7, and FIG. 8) and a value of priority of the print-control apparatus 201 is "1" (see a row 1003 in FIG. 12). Therefore, the image-forming apparatus 207 updates the value of priority to "3" as indicated by 1103 in FIG. 9 and does not respond to the print service.

Concerning the scan service, a value of priority of the image-forming apparatus 207 is "2" (see the row 806 in FIG. 7 and FIG. 8) and a value of priority of the print-control apparatus 201 is "2" (see a row 1004 in FIG. 12). As a result, the image-forming apparatus 207 responds to the scan service. Therefore, the image-forming apparatus 207 updates the value "2" of priority of the scan service to "1" as indicated by 1104 in FIG. 9. Concerning the Web service, since the Web service is present only in the image-forming apparatus 207, a value of priority is set to "1" as indicated by 1105 in FIG. 9.

Concerning media selection, as indicated by a row 1005 in FIG. 12, since the media selection is present only in the print-control apparatus 201, a value of priority of a media selection service is set to "3" in the image-forming apparatus 207 as indicated by a row 1106 in FIG. 9. Concerning SNMP/

MIB, according to a result of comparison of the row 808 in the function database in FIG. 7 and a row 1006 in the function database in FIG. 12, a value of priority is set to "1" as indicated by a row 1107 in FIG. 9. Provided services, values of priority of which are "3", may be deleted from the priority list.

After updating the function database in the step S508 in FIG. 4, the process proceeds to step S509 to normally start the image-forming apparatus 207 in a start mode with a print control function, followed by terminating the process.

<Process Flow During the Start of the Print-Control Apparatus 201>

A process during the start of the print-control apparatus 201 is explained with reference to FIGS. 10 to 12.

Figure 10:
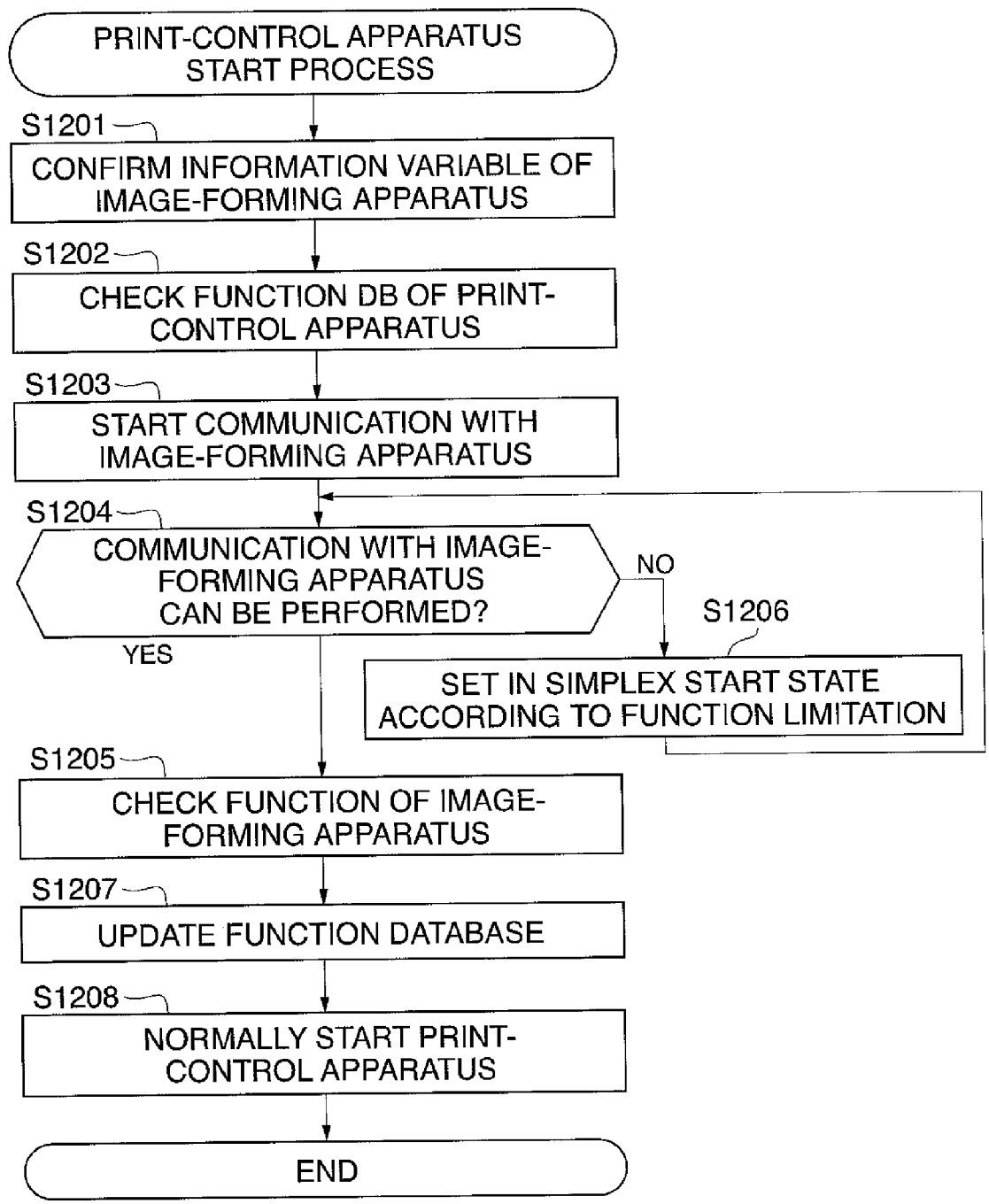
FIG. 10 is a flowchart showing a print-control apparatus start process executed during the start of the print-control apparatus according to the present embodiment.

FIG. 10 is a flowchart showing a print-control apparatus start process executed during the start of the print-control apparatus 201 according to the present embodiment. FIG. 11 is a diagram showing an example of a connection setting screen for an image-forming apparatus 207 displayed on the display unit 110 of the print-control apparatus 201 in FIG. 2. FIG. 12 is a diagram showing an example of a table including the contents of the function database set in the print-control apparatus 201 in FIG. 2.

In FIG. 10, when a power supply of the print-control apparatus 201 is turned on, in step S1201, the CPU 107 confirms an information variable of the image-forming apparatus 207. The information variable of the image-forming apparatus 207 is information for specifying the image-forming apparatus 207 connected to the print-control apparatus 201 in a one-to-one relation. Values of the information variable are values indicating a network address (an IP address, etc.), a physical address, a name, and the like of the image-forming apparatus 207 and set on an image-forming apparatus connection information screen 1401 in FIG. 11.

Specifically, a value presently inputted in an input area 1402 is displayed on the screen 1401 in FIG. 11 and, when the user depresses an "input" button 1403, a software keyboard screen for inputting a value is opened, and the user inputs connection information concerning the image-forming apparatus 207. After selecting the input area 1402, the user may input a value with a hardware keyboard without using the button 1403. When the input is finished, the user depresses a "close" button 1404.

When the input of the connection information concerning the image-forming apparatus 207 is finished on the screen 1401, this input value is stored in the information variable of the image-forming apparatus 207. In this case, a button or a form for selecting whether the input value is a network address, a physical address, or a name may be displayed.

In the following step S1202, the CPU 107 checks the function database of the print-control apparatus 201 shown in FIG. 12 and acquires a value of priority for each of provided services.

In FIG. 12, a column 1001 represents a type of a service function provided by the print-control apparatus 201. A column 1002 represents priority in respective service functions of the print-control apparatus 201. Rows 1003 to 1006 represent values of priority of the respective service functions. Contents indicated by values "1" to "3" of priority are the same as the contents indicated by the values of priority of the image-forming apparatus 207.

In the row 1003 indicating a print service, since a value of priority is set to "1", the print service is provided. Besides, as shown in FIG. 12, for a scan service in the row 1004, a media acquisition service in the row 1005, and an SNMP/MIB service in the row 1006, respective vales of priority are set.

When the acquisition of the values of priority in step S1202 is finished, the process proceeds to step S1203. In step S1203, the CPU 107 starts execution of communication with the image-forming apparatus 207 according to the connection information concerning the image-forming apparatus 207 acquired in the step S1201. In step S1204, the CPU 107 determines whether the communication with the image-forming apparatus 207 can be performed. When the communication cannot be performed, the process proceeds to step S1206 to start the print-control apparatus 201 in a state corresponding to the priority acquired in the step S1202.

Thereafter, when predetermined waiting time elapses, the process returns to the step 1204 to perform connection with the image-forming apparatus 207 again. The steps S1204 and S1206 are repeatedly performed until the communication with the image-forming apparatus 207 becomes possible. In this case, when the image-forming apparatus 207 is not started, the CPU 107 starts the image-forming apparatus 207 in a function limited state.

In the step S1204, the CPU 107 changes a communication method according to the connection information concerning the image-forming apparatus 207 acquired in the step S1201. When it is confirmed in the step S1204 that the communication with the image-forming apparatus 207 can be performed, the process proceeds to step S1205 to check a function of the image-forming apparatus 207. The image-forming apparatus 207 and the print-control apparatus 201 exchange services and priorities with each other.

Figures 13, 14:
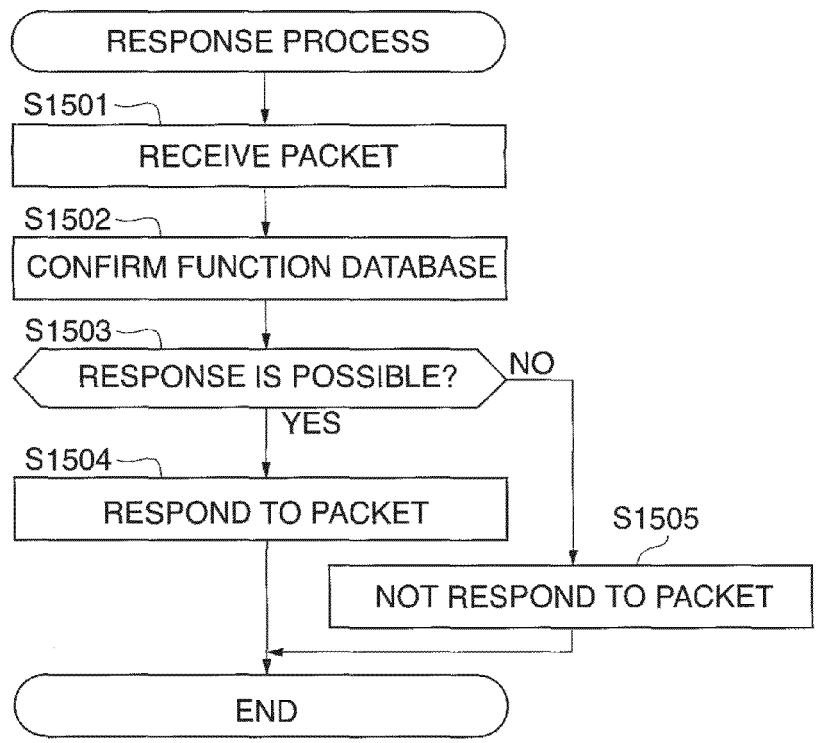
FIG. 13 is a diagram showing an example of an update result of the table including the contents of the function database set in the print-control apparatus in FIG. 2.
FIG. 14 is a flowchart showing a process executed during reception of a service inquiry packet in the print-control apparatus in FIG. 2 and the image-forming apparatus in FIG. 3.

Specifically, the print-control apparatus 201 transmits the priority list in the function database shown in FIG. 12 to the image-forming apparatus 207. The print-control apparatus 201 receives the priority list of the function database shown in FIG. 8 from the image-forming apparatus 207. The CPU 107 checks a function of the image-forming apparatus 207 in the step S1205. When the exchange of the priority lists is finished, the process proceeds to step S1207 to update the function database of the print-control apparatus 201. A result of the update of the function database is shown in FIG. 13. FIG. 13 is a diagram showing an example of an update result of the table including the contents of the function database set in the print-control apparatus 201 shown in FIG. 2.

A process for updating the function database is the same as that in the image-forming apparatus 207 described above. In this embodiment, the CPU 107 compares priorities in the function databases in FIGS. 8 and 12 according to update process same as described above and adjusts the priorities as described below.

First, concerning the print service, a value of priority of the image-forming apparatus 207 is "3" (see the row 805 in FIG. 7 and FIG. 8) and a value of priority of the print-control apparatus 201 is "1" (see the row 1003 in FIG. 12). Therefore, the print-control apparatus 201 updates the value of priority to "1" as indicated by a row 1301 in FIG. 13 and responds to the print service.

Concerning the scan service, a value of priority of the image-forming apparatus 207 is "2" (see the row 806 in FIG. 7 and FIG. 8) and a value of priority of the print-control apparatus 201 is "2" (see a row 1004 in FIG. 12). As a result, the image-forming apparatus 207 responds to the scan service. Therefore, the print-control apparatus 201 updates the value "2" of priority of the scan service to "3" as indicated by a row 1302 in FIG. 13. Concerning the Web service, since the Web service is present only in the image-forming apparatus 207, a value of priority is set to "3" as indicated by a row 1303 in FIG. 13.

Concerning media selection, as indicated by a row 1005 in FIG. 12, since the media selection is present only in the print-control apparatus 201, a value of priority of a media selection service is set to "1" in the print control apparatus 201 as indicated by a row 1304 in FIG. 13. Concerning SNMP/MIB, according to a result of comparison of the row 808 in the function database in FIG. 7 and the row 1006 in the function database in FIG. 12, a value of priority is set to "3" as indicated by a row 1305 in FIG. 13. Provided services, values of priority of which are "3", may be deleted from the priority list.

After updating the function database in step S1207 in FIG. 10, the process proceeds to step S1208 to start the print-control apparatus 201, followed by terminating the process.

<Process Flow During Reception of a Service Inquiry Packet>

A process performed when an inquiry is received from the terminal apparatus 211 concerning service functions which can be provided in the image-forming apparatus 207 and the print-control apparatus 201, which start as described above, is explained with reference to FIG. 14.

FIG. 14 is a flowchart showing a response process during reception of a service inquiry packet according to this embodiment in the image-forming apparatus 207 and the print-control apparatus 201. Although this process is executed by the CPUs included in the image-forming apparatus 207 and the print-control apparatus 201, this is not limitative, but this process may be executed by any one of the CPUs included in the image-forming apparatus 207 and the print-control apparatus 201.

First, in step S1501, the CPUs detect that a service inquiry packet transmitted from the terminal apparatus 211 is received. The CPUs discriminate which service function the packet inquires about. The CPUs use port information of TCP for this discrimination. The CPUs may perform the discrimination as a method of confirming all data structures of a packet and detecting a service or a method of discriminating a service function using a protocol of a network layer.

When the discrimination on a service function is finished, the process proceeds to step S1502, and function databases are confirmed. As the function databases, the CPUs use the function database for the image-forming apparatus 207 shown in FIG. 9 and the function database for the print-control apparatus 201 shown in FIG. 13 created during the start. The CPUs confirm the function databases, and then the process proceeds to step S1503. In step S1503, Each CPU confirms a value of priority on the function database, which is associated with the packet received in the step S1501, and determines whether any one of the image-forming apparatus 207 and the print-control apparatus 201 may respond to the received packet. In the case of a provided service function which is not present in the function databases, the image-forming apparatus 207 and/or the print-control apparatus 201 may not return response or may unconditionally respond to the received packet.

When it is determined that any one of the image-forming apparatus 207 and the print-control apparatus 201 may respond to the received packet, the process proceeds to step S1504, and one of the image-forming apparatus 207 and the print-control apparatus 201 returns a response to the received packet. Consequently, the image-forming apparatus 207 or the print-control apparatus 201 responds to the service inquiry. When any one of the image-forming apparatus 207 and the print-control apparatus 201 must not respond to the packet (YES to the step S1503), the process proceeds to step S1505, and it does not respond to the packet. Concerning provided service functions, values of priority of which are "3", the image-forming apparatus 207 and the print-control apparatus 201 may finish the services. The print-control apparatus 201 may respond to an inquiry about a service from the image-forming apparatus 207 regardless of priority. The image-forming apparatus 207 may respond to an inquiry about a service from the print-control apparatus 201 regardless of priority.

According to the present embodiment, in the system in which the print-control apparatus and the image-forming apparatus are connected on the identical network, the print-control apparatus and the image-forming apparatus mutually confirm and arbitrate service functions provided by the apparatuses. Only an appropriate one of the print-control apparatus and the image-forming apparatus responds to, on the basis of a result of the arbitration, a service inquiry packet transmitted on the network. In other words, as described above, the print-control apparatus 201 and the image-forming apparatus 207 adjust and appropriately create function databases, whereby any one of the print-control apparatus 201 and the image-forming apparatus 207 responds to the service inquiry packet from the terminal apparatus 211.

Consequently, it is possible to realize a user-friendly system environment. For example, when the user performs print operation in the image-forming apparatus 207 attached with the print-control apparatus 201 from the terminal apparatus 211, the user does not have a trouble in deciding which of the network addresses of the print-control apparatus 201 and the image-forming apparatus 207 should be designated. Even when the user performs device search using an application program and searches for a device on the network, it is possible to prevent a situation in which both the print-control apparatus 201 and the image-forming apparatus 207 are detected and the user is confused.

It is possible to flexibly cope with a new technique by changing the connection of the print-control apparatus 201 and the image-forming apparatus 207, which provides a system which can cope with a large number of service functions.

In this way, it is possible to realize a system environment which is user-friendly and can make full use of a large number of service functions, to thereby flexibly cope with the techniques such as IPv6 and IPsec.

<Modification of the Connection>

The connection of the print-control apparatus 201 and the image-forming apparatus 207 is not limited to the connection according to the embodiment described above. Various modifications of the connection are possible. Examples of the modification include those shown in FIGS. 15A to 15C.

Figure 15A:
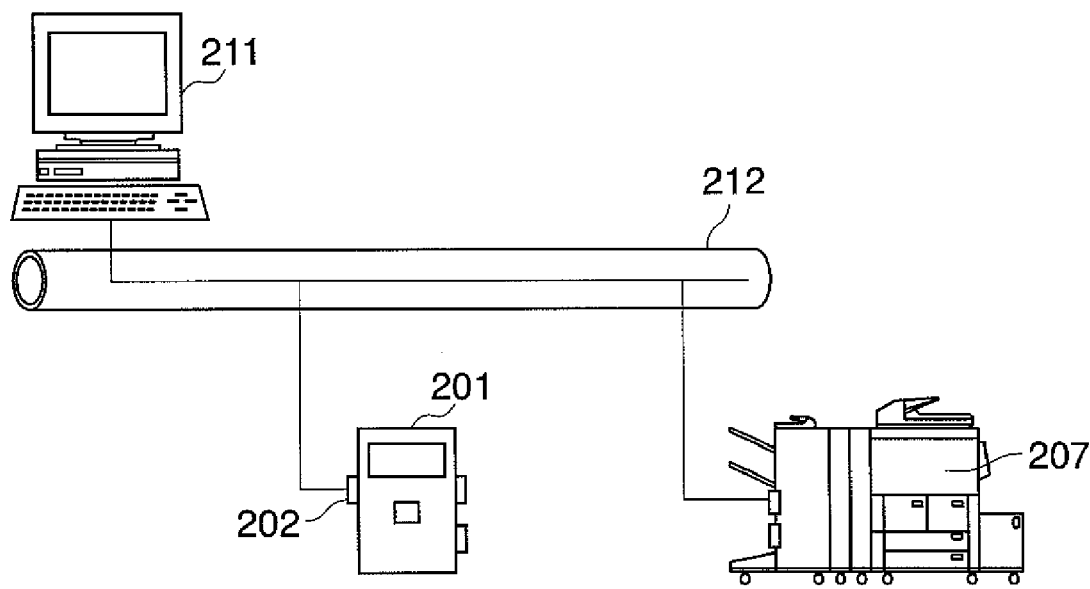
FIGS. 15A to 15C are schematic diagrams showing variations of the connection of the image-forming system according to the embodiment.
Figure 15B:
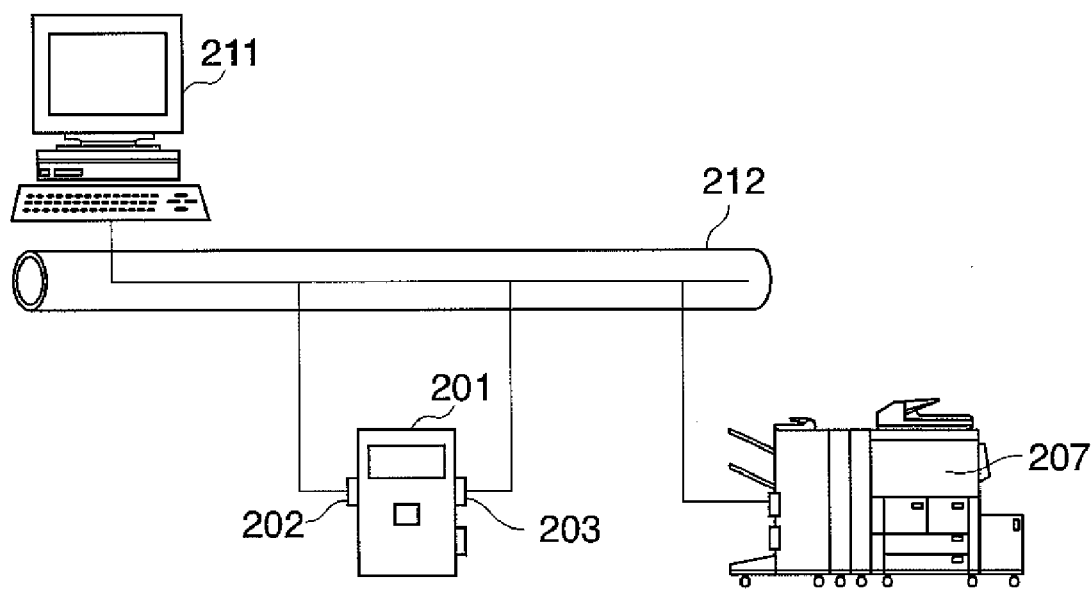
Figure 15C:
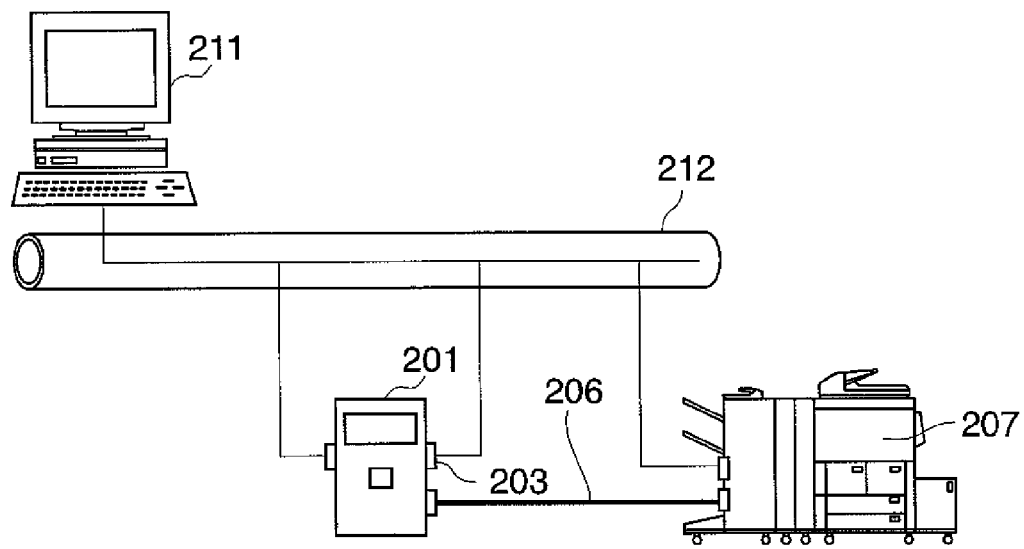

FIGS. 15A to 15C are schematic diagrams showing variations of the connection of the image-forming system according to this embodiment.

An image-forming system shown in FIG. 15A has a configuration in which the dedicated line 206 is removed from the connection shown in FIG. 1. Data is transferred from the print-control apparatus 201 through the network 212. Since reception and transmission of the data are performed in the connector 202, network traffic increases. However, a reduction in cost is possible because the dedicated line 206 is not used.

An image-forming system shown in FIG. 15B has a configuration in which the dedicated line 206 is removed from the connection shown in FIG. 1 and the connector 203 is connected to the network 212. As in the connection shown in FIG. 15A, a reduction in cost is possible by removing the dedicated line 206. In this connection, since the connectors 202 and 203 are connected to the identical network 212, the same data can be received from the connectors 202 and 203. Therefore, in the present variation, one of the connectors 202 and 203 is used as a connector exclusively used for data transfer to and from the image-forming apparatus 207 and the other is used as a connector for other communication.

An image-forming system shown in FIG. 15C has a configuration in which the connector 203 is connected to the network 212 from the connection shown in FIG. 1. Decentralization of processing is realized by performing data transfer through the network 212 and the dedicated line 206.

In the present embodiment, the print-control apparatus 201 and the image-forming apparatus 207 are connected in a one-to-one relation. However, the present invention is also applicable when the print-control apparatus 201 and the image-forming apparatus 207 is connected in one-to-many, many-to-one, and many-to-many relations.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Moreover, it is to be understood that the functions of the above described embodiment may be accomplished by writing a program code read out from the storage medium into a memory provided on an expansion board inserted into a computer or in an expansion unit connected to the computer and them causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-184476, filed Jul. 13, 2007, which is hereby incorporated by reference herein in its entirety.

What is claimed is:

1. An image-forming apparatus providing a plurality of service functions, comprising:
   a control unit adapted to determine whether the image-forming apparatus is connected to a control apparatus; and
   a response unit adapted to respond to an inquiry concerning each of the plurality of service functions,
   wherein the control unit controls said response unit,
   (a) in a case that it is determined by said control unit that the image-forming apparatus is connected to the control apparatus, to respond to an inquiry associated with a part of the plurality of service functions and not to respond to an inquiry associated with another part of the plurality of service functions, and,
   (b) in a case that it is determined by said control unit that the image-forming apparatus is not connected to the control apparatus, to respond to the inquiry associated with the part of the plurality of service functions and the inquiry associated with the another part of the plurality of service functions.

2. The image-forming apparatus as claimed in claim 1, further comprising:
   a storage unit adapted to store information indicating the plurality of service functions;
   an acquisition unit adapted to acquire, in a case that it is determined by said determination unit that the image-forming apparatus is connected to the control apparatus, information indicative of a service function which the control apparatus can provide, from the control apparatus; and
   a comparison unit adapted to compare the information stored by said storage unit and the information acquired by said acquisition unit,
   wherein the control unit determines the part of the plurality of service functions and the another part of the plurality of service functions according to a result of the comparison by said comparison unit.

3. The image-forming apparatus as claimed in claim 2, wherein said storage unit stores each of the plurality of service functions in association with priority, and said control unit determines the part of the plurality of service functions and the another part of the plurality of service functions according to the priority stored by said storage unit.

4. The image-forming apparatus as claimed in claim 2, further comprising a transmission unit adapted to transmit the information stored by said storage unit to the control apparatus.

5. The image-forming apparatus as claimed in claim 1, wherein the image-forming apparatus is connected to a network and connected to the control apparatus by a communication device other than the network.

6. The image-forming apparatus as claimed in claim 5, wherein said control unit determines whether the image-forming apparatus is connected to the control apparatus via the communication device other than the network.

7. The image-forming apparatus as claimed in claim 2, wherein said control unit determines a service function provided by only the image-forming apparatus as the another part of the service functions and determines a service function provided only by the control apparatus as the part of the service functions.

8. The image-forming apparatus as claimed in claim 1, wherein the plurality of service functions include a print function and a scan function.

9. A control method of controlling an image-forming apparatus that provides a plurality of service functions, the control method executed by the image forming apparatus and comprising: determining whether the image-forming apparatus is connected to a control apparatus; responding to an inquiry concerning each of the plurality of service functions; and controlling said responding step, (a) in a case that it is determined in said determining step that the image-forming apparatus is connected to the control apparatus, to respond to an inquiry concerning a part of the plurality of service functions and not to respond to an inquiry concerning another part of the plurality of service functions, and, (b) in a case that it is determined in said determining step that the image-forming apparatus is not connected to the control apparatus, to respond to the inquiry associated with the part of the plurality of service functions and the inquiry associated with the another part of the plurality of service functions.

10. A non-transitory computer-readable storage medium storing a program for causing a computer of an image forming apparatus to execute a control method of controlling the image-forming apparatus that provides plural service functions, the program comprising: a determination module for determining whether the image-forming apparatus is connected to a control apparatus; a response module for responding to an inquiry concerning each of the plurality of service functions; and a control module for controlling said responding module, (a) in a case that it is determined by said determination module that the image-forming apparatus is connected to the control apparatus, to respond to an inquiry concerning a part of the plurality of service functions and not to respond to an inquiry concerning another part of the plurality of service functions, and, (b) in a case that it is determined by said determination module that the image-forming apparatus is not connected to the control apparatus, to respond to the inquiry associated with the part of the plurality of service functions and the inquiry associated with the another part of the plurality of service functions.

* * * * *